INVENTORS.
EVERETT H. ANDRUS
AND GEORGE M. COON

Oct. 17, 1961 E. H. ANDRUS ET AL 3,004,647
SINGLE STROKE CONTROL SYSTEM AND FLUID
CONTROL UNIT THEREFOR
Filed March 20, 1959 5 Sheets-Sheet 3

INVENTORS.
EVERETT H. ANDRUS
AND GEORGE M. COON
BY
*J. D. Douglass*
*their* ATTORNEY.

INVENTORS.
EVERETT H. ANDRUS
AND GEORGE M. COON

*By J. D. Douglas*
Their ATTORNEY.

United States Patent Office 3,004,647
Patented Oct. 17, 1961

3,004,647
SINGLE STROKE CONTROL SYSTEM AND
FLUID CONTROL UNIT THEREFOR
Everett H. Andrus, Berea, and George M. Coon, South
Euclid, Ohio, assignors to Textrol, Inc., Cleveland,
Ohio
Filed Mar. 20, 1959, Ser. No. 800,894
28 Claims. (Cl. 192—142)

This invention relates to improvements in a single cycle control for a machine.

Many types of machines used in industry are so inherently dangerous that their operation must be limited to a single stroke at a time. Examples of such machines are punch presses, power-operated cutters, and other machines capable of seriously injuring the operator if he happens to have his fingers or any other part of his body in the way of the moving parts of the machine.

Various "two-hand" start controls have been proposed heretofore which require that the operator have both hands out of the way before he can start the machine. Commonly, such "two-hand" start controls comprise a pair of spaced switches which must be actuated by the respective hands of the operator either simultaneously or within a predetermined interval of one another in order to start the machine. Such safety controls have been generally satisfactory for their limited purpose, which is to insure that the operator himself cannot cause a stroke of the machine except by moving his hands out of the way to operate the switches.

Various controls have been devised whose purpose is to stop the machine automatically at the end of each stroke. Many such controls incorporate the "two-hand" start principle just described. However, in all such controls heretofore the malfunctioning of a single component in the control may permit the machine to go through repeated cycles of operation. Because the operator is not expecting this, he may have his hands in a dangerous position, particularly since he will have developed a certain rhythm of movement in operating the machine.

Such failures in the controls themselves, involving no fault of the operator of the machine, have resulted in rather frequent and serious accidents whose toll in human misery and monetary damage is immense.

The present invention is directed to a novel control for such machines which reduces the possible occurrence of an unexpected repeat stroke of the machine to a virtual mathematical impossibility. In the preferred embodiment of this invention, such optimum reliability is obtained by providing a unified control which includes every component involved in controlling the operation of the machine. Failure of any one of these components will prevent the next stroke of the machine from taking place. Moreover, in the present system each component has a counterpart which independently performs the same control function. Therefore, for the system to fail, it would be necessary for two control components to fail at the same time. Thus, if the probability of failure of a particular control component, such as a valve, relay or switch, is one in 1,000,000 operations, the probability that two control components will fail at the same time is reduced to one in 1,000,000,000,000.

In addition to the dual arrangement of control components, the present system automatically monitors the performance of each component during each cycle of operation of the machine. Should any individual component fail to perform properly, the operator cannot start the next stroke of the machine. Therefore, the greatly enhanced protection provided by the dual system cannot be lost by an undetected failure of any single component in the system.

It is an object of the present invention to provide a novel and improved control system for a machine.

It is also an object of this invention to provide a novel control system for limiting a machine to a single cycle of operation at a time, which system is more reliable in operation than prior systems for the same purpose.

Another object of this invention is to provide a novel single stroke control system for a machine in which the performance of each component of the control system is monitored during each cycle of operation of the machine, so that upon failure of any component the next cycle of operation of the machine cannot be initiated.

A further object of this invention is to provide a novel control for automatically limiting a machine to a single stroke which may be used with any suitable control arrangement intended to restrict the operator to single stroke operation of the machine, so that the complete system is substantially foolproof in operation, whether in the event of failure in the automatic control or in the event the operator attempts to "beat" the control.

Another aspect of this invention is concerned with a fluid control unit for controlling the application of fluid pressure to start or stop the machine. While this fluid control unit is extremely important to the successful operation of the present control system, it is not limited in its utility to the present system, but may also be used in other control systems for the same general purpose to provide a monitored dual control over the application of fluid pressure to start or stop the machine.

Therefore, it is also an object of this invention to provide a novel fluid control unit for use in a single stroke control system for a machine.

Further objects and advantages of the present invention will be apparent from the following detailed description of a presently preferred embodiment thereof, which is illustrated in the accompanying drawings.

Figure 1:
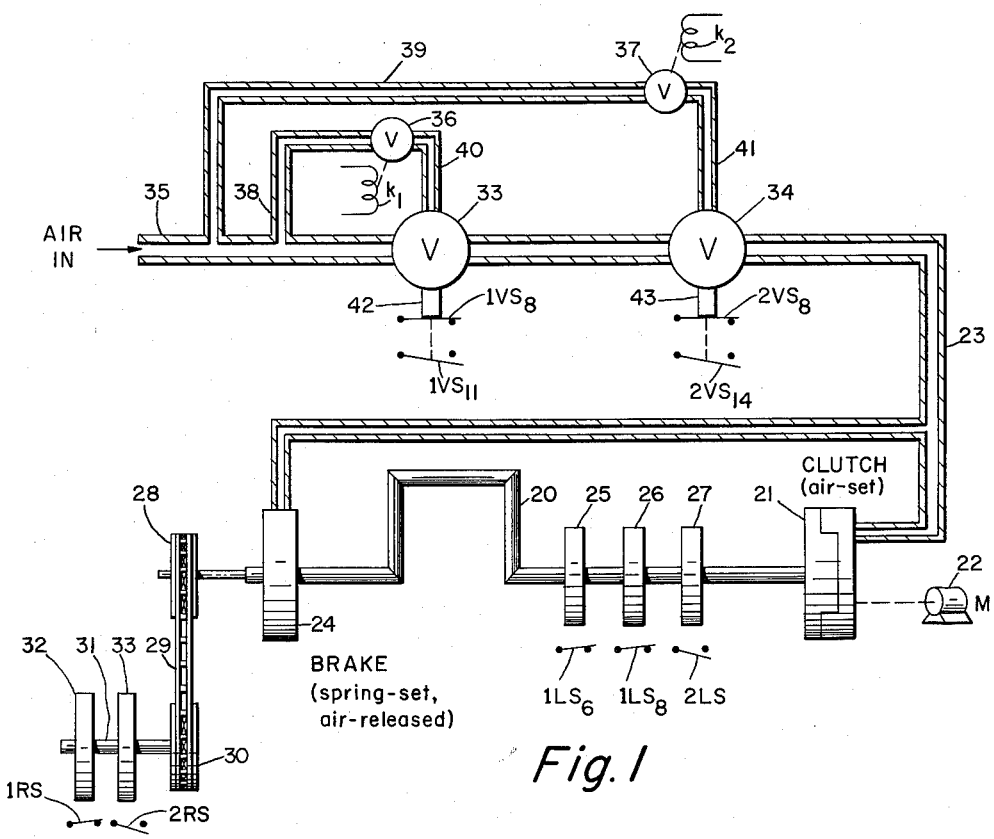
FIGURE 1 shows schematically the drive arrangement for the crankshaft of a machine, together with the air-operated control for starting and stopping the crankshaft and the various limit switches operated during the stroke of the crankshaft.

Referring first to FIG. 1, the rotary crankshaft 20 of the machine is connected through a clutch 21 to a continuously operating drive motor 22. The machine itself may be a punch press or any other machine intended to have single stroke operation for the operator's safety. Normally, in the absence of air pressure in line 23, the clutch is disconnected so that the motor 22, even though energized, does not drive the crankshaft 20. The crankshaft also is provided with a brake 24 which is spring-set to lock the crankshaft against movement. However, when air pressure appears in line 23, the brake is released.

The crankshaft carries a series of cams 25, 26 and 27 which control the operation of limit switches 1LS$_6$, 1LS$_8$ and 2LS, respectively.

Figure 2:
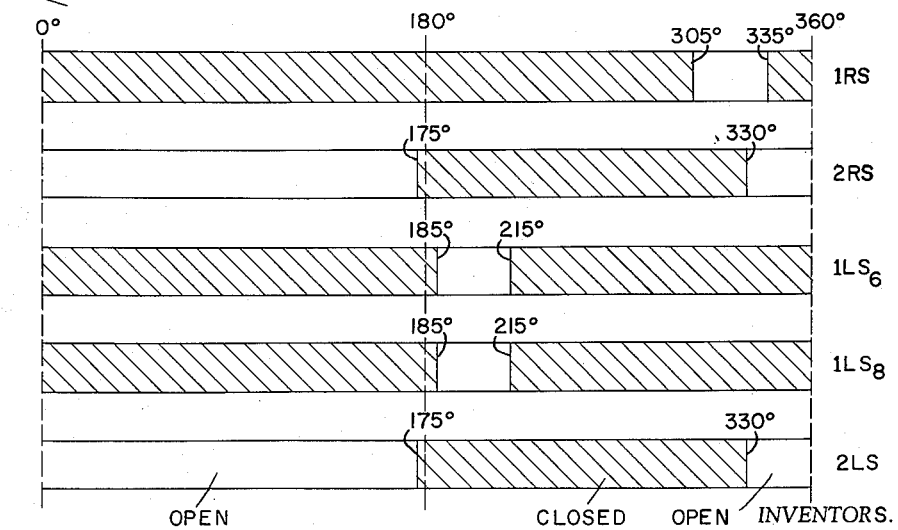
FIGURE 2 shows the condition of these limit switches at various times during the stroke of the crankshaft, each shaded portion indicating that the switch is closed and each unshaded portion indicating that the switch is open.

As shown in FIG. 2, both of the switches 1LS₆ and 1LS₈ are closed throughout slightly more than the first half of the rotation of crankshaft 20. Both these switches open at approximately 185° of the crankshaft rotation and close again about 30° later.

Switch 2LS is open from 0° to about 175° of the crankshaft rotation and is closed from 175° to about 330°, at which time it opens.

Coupled to the crankshaft 20 is a sprocket 28 which drives a chain 29, which drives a sprocket 30 connected to a rotary shaft 31. A pair of cams 32 and 33 are mounted on shaft 31 to turn therewith. Cam 32 operates a limit switch 1RS, while cam 33 operates a limit switch 2RS.

As shown in FIG. 2, switch 1RS is closed from 0° to about 305° of rotation of the crankshaft, is open from 305° to about 335°, at which time it closes and remains closed through the remainder of the cycle.

Switch 2RS is open from 0° to about 175°, is closed from 175° to about 330°, and is open from 330° to the end of the cycle.

The air supply to line 23 for releasing the brake 24 and connecting the clutch 21 is under the joint control of the fluid control unit which forms part of the present invention. This fluid control unit (shown in FIG. 4 and described in detail hereinafter) comprises a pair of poppet valves 33 and 34 which are connected in series in the air line between the air inlet 35 and line 23. Poppet valve 33 is under the control of a pilot valve 36 operated by solenoid $K_1$. Similarly, poppet valve 34 is under the control of a pilot valve 37 operated by solenoid $K_2$. Each of the pilot valves is normally open and each has its inlet connected to the air inlet line 35 ahead of the first poppet valve 33, through separate lines 38 and 39, respectively. The outlet line 40 from pilot valve 36 is connected to the poppet chamber in valve 33 to maintain valve 33 closed normally, i.e., when pilot valve 36 is open. Similarly, the outlet line 41 from pilot valve 37 is connected to the poppet chamber in valve 34 to maintain valve 34 closed when pilot valve 37 is open.

When solenoid $K_1$ is energized, it closes pilot valve 36 and the first poppet valve 33 opens.

When solenoid $K_2$ is energized, it closes pilot valve 37 and poppet valve 34 opens.

The first poppet valve 33 is provided with a plunger 42 connected to the movable valve element in this valve and projecting beyond the valve casing. Plunger 42 operates a pair of switches 1VS₈ and 1VS₁₁. These switches are incorporated in a double-pole switch unit of known construction. Normally (i.e., with pilot valve 36 open and poppet valve 33 closed) the plunger is in its extended position beyond the valve casing and maintains switch 1VS₈ closed and switch 1VS₁₁ open. When poppet valve 33 opens, in response to the energization of solenoid $K_1$ and the closing of pilot valve 36, as described, the plunger 42 is retracted and switch 1VS₈ opens and switch 1VS₁₁ closes.

In like manner, the second poppet valve 34 is provided with a plunger 43 which operates a pair of switches 2VS₈ and 2VS₁₄. Normally (i.e., when poppet valve 34 is closed), the plunger 43 is in its extended position and maintains switch 2VS₈ closed and switch 2VS₁₄ open. When valve 34 opens, as described, the plunger 43 is retracted and switch 2VS₈ opens and switch 2VS₁₄ closes.

Figure 3:
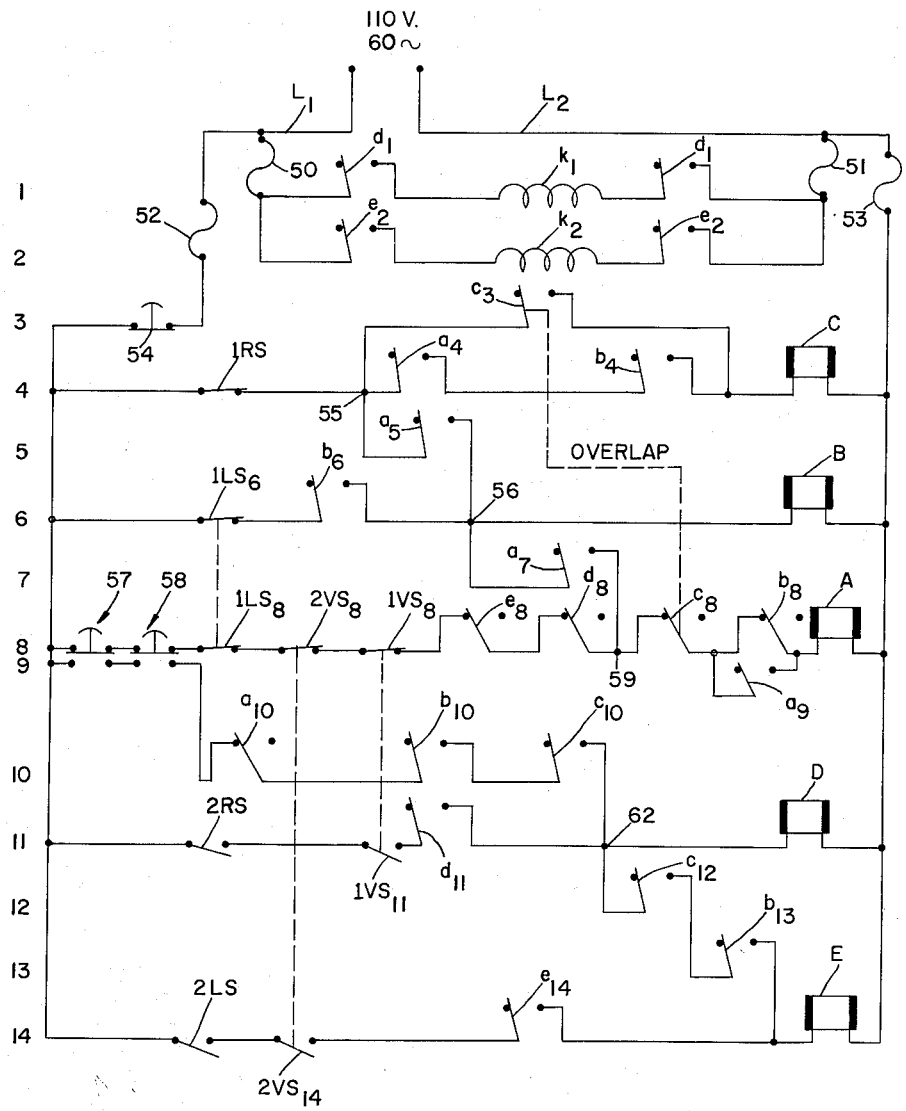
FIGURE 3 is a schematic diagram of one embodiment of the electrical circuit in the present control system.

Turning now to the control circuit in the present invention, FIG. 3 shows a schematic circuit diagram having the lines numbered for convenience of understanding the operation of the circuit. Five relays, A, B, C, and E, are provided which operate correspondingly lettered sets of contacts in the various lines. The different sets of contacts are lettered according to the relay which operates them, together with a subscript identifying the line in which they appear. For example, the set of contacts labelled "$a_4$" is operated by relay A and is connected in line 4.

The power supply lines $L_1$ and $L_2$ are connected across a suitable supply of 110 volt, 60 cycle alternating current.

Line 1 is connected, through fuses 50 and 51, across the power supply lines and includes, in series, a first set of contacts $d_1$ operated by relay D, the solenoid coil $K_1$ and a second set of contacts $d_1$ operated by relay D. Normally (i.e., with relay D de-energized) both sets of relay contacts $d_1$ are open.

Line 2 is connected, through fuses 50 and 51, across the power supply lines $L_1$ and $L_2$. This line includes, in series, a first set of relay contacts $e_2$ operated by relay E, the solenoid coil $K_2$ and a second set of relay contacts $e_2$ operated by relay E. Normally (i.e., with relay E de-energized) both sets of relay contacts $e_2$ are open.

Line 4 is connected across the power supply lines $L_1$ and $L_2$ through fuses 52 and 53 and a normally-closed "emergency stop" push button switch 54. Line 4 includes, in series, the previously mentioned limit switch 1RS, which is operated by the chain-driven cam 32 in FIG. 1, a set of relay contacts $a_4$ operated by relay A, a set of relay contacts $b_4$ operated by relay B, and the coil of relay C. Normally (i.e., with relay A de-energized) the relay contacts $a_4$ are open. Also, the relay contacts $b_4$ are normally open (relay B being de-energized).

Line 3 contains the set of relay contacts $c_3$, operated by relay C, connected across the series-connected sets of contacts $a_4$ and $b_4$. Contacts $c_3$ normally are open.

Line 6 is connected in parallel with line 4 and includes, in series, the limit switch 1LS₆, which is operated by the cam 25 on the crankshaft in FIG. 1, a set of relay contacts $b_6$ operated by relay B, and the coil of relay B. Normally (i.e., with relay B de-energized) the relay contacts $b_6$ are open.

Line 5 contains a set of relay contacts $a_5$ operated by relay A, connected from point 55 in line 4, which is between limit switch 1RS and the set of relay contacts $a_4$, and point 56 in line 6, which is between the set of relay contacts $b_6$ and the coil of relay B.

Line 8 is connected in parallel with lines 4 and 6, and includes, in series, the normally-closed contacts of the "run" switches 57 and 58, the limit switch 1LS₈, which is operated by the cam 26 on the crankshaft in FIG. 1, the switch 2VS₈, which is operated by the second poppet valve 34 in FIG. 1, the switch 1VS₈, which is operated by the first poppet valve 33 in FIG. 1, a set of relay contacts $e_8$ operated by relay E, a set of relay contacts $d_8$ operated by relay D, a set of relay contacts $c_8$ operated by relay C, a set of relay contacts $b_8$ operated by relay B, and the coil of relay A. With their respective relays de-energized, contacts $e_8$ are normally closed, contacts $d_8$ are normally closed, contacts $c_8$ are normally closed, and contacts $b_8$ are normally closed. The contacts $c_3$ and $c_8$ of relay C are of a known construction which provides an overlap between them, such that the $c_3$ contacts close before the $c_8$ contacts are open when relay C is energized.

Line 7 includes a set of relay contacts $a_7$ connected between point 56 in line 6 and point 59 in line 8, which is between the sets of relay contacts $d_8$ and $c_8$.

Line 9 includes a set of relay contacts $a_9$ connected across the relay contacts $b_8$ in line 8.

Line 9 also includes, separate from the relay contacts $a_9$, the normally-open contacts of the "run" switches 57 and 58. These switch contacts are connected in series with each other to the power line $L_1$ through the "emergency stop" switch 54 and fuse 52.

Line 11 is connected in parallel with lines 4, 6 and 8. It includes, in series, the limit switch 2RS, which is operated by the chain driven cam 33 in FIG. 1, the switch 1VS₁₁, which is operated by poppet valve 33 in FIG. 1, a set of relay contacts $d_{11}$ operated by relay D, and the coil of relay D. Normally, with relay D de-energized, the relay contacts $d_{11}$ are open.

Line 10 includes, in series, a set of relay contacts $a_{10}$ operated by relay A and connected to the normally-open contacts of the second "run" switch 58 in line 9, a set of relay contacts $b_{10}$ operated by relay $b$, and a set of relay contacts $c_{10}$ operated by relay $c$ and connected to the point 62 in line 11, which is between the set of relay contacts $d_{11}$ and the coil of relay $d$. Normally, with their respective relays de-energized, contacts $a_{10}$ are closed, contacts $b_{10}$ are open, and contacts $c_{10}$ are open.

Line 14 is connected in parallel with lines 4, 6, 8 and 11, and includes, in series, the limit switch 2LS operated by cam 27 on the crankshaft in FIG. 1, the switch $2VS_{14}$ operated by the second poppet valve 34 in FIG. 1, a set of contacts $e_{14}$ operated by relay E, and the coil of relay E. Normally (i.e., with relay E de-energized) the contacts $e_{14}$ are open.

Lines 12 and 13 include the series-connected sets of relay contacts $c_{12}$ and $b_{13}$, which are connected between point 62 in line 11 and point 63 in line 14, which is between the relay contacts $e_{14}$ and relay E.

In FIG. 3, the various sets of relay contacts are shown in their normal (relay de-energized) positions. Also, the various cam-operated and valve-operated switches are shown in their respective states when the crankshaft is at its 0° (360°) position just prior to the beginning of a stroke.

Relays B and C in FIG. 3 function as "anti-repeat" relays, relay A is a set-up relay which conditions the anti-repeat relays for operation, and relays D and E control the energization of the solenoids $K_1$ and $K_2$ which control the operation of the pilot valves 36 and 37 for the poppet valves 33 and 34 in FIG. 1.

In operation, when lines $L_1$ and $L_2$ are connected across the power source, the set-up relay A is energized through line 8, all of the switches and relay contacts in this line being normally closed.

Such energization of relay A causes its contacts $a_9$ in line 9 to close, thereby completing a holding circuit which maintains relay A energized independent of relay B.

Also, such energization of relay A closes the "$a$" contacts in line 4, 5 and 7 and opens the normally closed "$a$" contacts in line 10.

Anti-repeat relay B now becomes energized as follows: from power supply line $L_1$ through line 8 to the point 59, through the now-closed $a_7$ contacts (line 7) to point 56 in line 6, and through the coil of relay B to line $L_2$.

Such initial energization of relay B closes its set of contacts $b_6$ and thereby completes a holding circuit in line 6 for itself through the normally closed limit switch $1LS_6$ and now-closed relay contacts $b_6$, so that relay B will remain energized independent of the set-up relay A.

The energization of relay B also closes the "$b$" contacts in lines 4, 10 and 13 and opens the set of contacts $b_8$ in line 8. The opening of contacts $b_8$ does not affect the energization of the set-up relay A at this time because of the latter's holding circuit through contacts $a_9$.

The energization of the anti-repeat relay B completes an energization circuit in line 4 for the other anti-repeat relay C, as follows: from power supply line $L_1$ through the normally-closed limit switch 1RS, the closed contacts $a_4$ of the now-energized set-up relay A, and the closed contacts $b_4$ of the now-energized relay B.

Such initial energization of relay C causes its set of contacts $c_3$ in line 3 to close, completing a holding circuit for relay C through limit switch 1RS in line 4 and the now-closed contacts $c_3$ in line 3. This holding circuit maintains relay C energized independent of either the set-up relay A or the first anti-repeat relay B.

The energization of relay C also closes the "$c$" contacts in lines 10 and 12 and opens the "$c$" contacts in line 8. As already pointed out, the construction of the relay is such that the $c_3$ contacts close before the $c_8$ contacts open.

Such opening of the contacts $c_8$, in response to the energization of relay C, breaks the energization circuit through line 8 for the set-up relay A. Accordingly, relay A becomes de-energized, and its contacts in lines 4, 5, 7 and 9 open and its contact in line 10 closes.

Because of the opening of contacts $a_5$ in line 5, the anti-repeat relays B and C are now isolated from each other and each is energized independent of the other. This condition is maintained for the cycle of operation of the machine which is to follow.

To recapitulate the operation thus far, when power is applied to the lower lines $L_1$ and $L_2$, the set-up relay A is energized and it causes the anti-repeat relays B and C to become energized in sequence. Then the set-up relay A is de-energized and the anti-repeat relays B and C are maintained energized independent of each other.

The single stroke of the machine is initiated by manually depressing the "run" push-button switches 57 and 58 in lines 8 and 9. In accordance with accepted safety practice, these switches are so located on the machine as to require both hands of the operator to be out of the way of the moving parts of the machine. In the illustrated embodiment, these switches must be held depressed for almost the entire first half of the cycle of the machine, so that there is no possibility of the operator removing his hands to a dangerous position.

It is to be understood, however, that the present invention does not require such a "two-hand" start control. If desired, a single "run" switch may be provided to start the machine, although this is generally regarded as undesirable from the safety standpoint. In the event that a "two-hand" start control is used, it may be of any type desired since the present control system is readily compatible with any such arrangement.

The operation of the "run" switches 57 and 58 completes an energization circuit for valve relay D as follows: from power line $L_1$, through fuse 52 and the normally-closed "emergency stop" switch 54, the now-closed contacts of "run" switches 57 and 58 in line 9, the normally-closed contacts $a_{10}$ of de-energized relay A, the now-closed contacts $b_{10}$ of energized relay B. The now-closed contacts $c_{10}$ of energized relay C, through the coil of relay D, and through fuse 53 to the other power line $L_2$.

Relay E is energized at the same time through the now-closed contacts in line 9 of "run" switches 57 and 58, the $a_{10}$, $b_{10}$ and $c_{10}$ contacts, and the now-closed contacts $c_{12}$ and $b_{13}$ of energized relays C and B, respectively.

As a result:

(1) Both sets of relay contacts $d_1$ in line 1 close;

(2) Both sets of relay contacts $e_2$ in line 2 close;

(3) The normally-closed contacts $d_8$ in line 8 open;

(4) The normally-closed relay contacts $e_8$ in line 8 open;

(5) The normally-open relay contacts $d_{11}$ in line 11 close; and (6) The normally-open relay contacts $e_{14}$ in line 14 close.

Solenoid $K_1$ in line 1 becomes energized from power line $L_1$, through fuse 50, both sets of relay contacts $d_1$ in line 1, and fuse 51 to power line $L_2$.

At the same time, solenoid $K_2$ becomes energized through both sets of relay contacts $e_2$ in line 2.

The energization of solenoids $K_1$ and $K_2$ causes the pilot valves 36 and 37 in FIG. 1 to close, which open the poppet valves 33 and 34 admitting air under pressure to the clutch 21 and the brake 24. The brake is thereby released and the clutch is engaged, coupling the drive motor 22 to crankshaft 20 so that the crankshaft begins to turn.

At the same time, the retraction of plunger 42, when valve 33 opens, causes switch $1VS_8$ in line 8 to open and switch $1VS_{11}$ in line 11 to close. Also, the retraction of plunger 43, when valve 34 opens, causes switch $2VS_8$ in line 8 to open and switch $2VS_{14}$ in line 14 to close.

It should be noted that in the present control each of the "anti-repeat" relays B and C (which are isolated from each other) has complete control over the initiation of the stroke of the machine. Thus, if either of these relays is not energized, the valve relays D and E cannot become energized to cause the stroke to begin, as just described.

With the stroke having begun in the manner just described, the "run" switches 57 and 58 must be held depressed for the first 175° of rotation of the crankshaft. At 175° the limit switches 2RS and 2LS are closed by the chain-driven cam 33 and the crankshaft cam 27, respectively.

The closing of limit switch 2RS completes a holding circuit through line 11 for relay D as follows: through the now-closed limit switch 2RS, the now-closed valve switch $1VS_{11}$, and the now-closed contacts $d_{11}$ to the coil of relay D.

The closing of limit switch 2LS completes a holding circuit for relay E through line 14 as follows: through the now-closed limit switch 2LS, the now-closed valve switch $2VS_{14}$, and the now-closed relay contacts $e_{14}$ to the coil of relay E.

Now the "run" switches 57 and 58 may be released and relays D and E will continue to be energized through their respective holding circuits in lines 11 and 14. Such release of these switches causes their normally-closed contacts in line 8 to reclose.

As indicated in FIG. 2, the limit switches $1LS_6$ and $1LS_8$ are opened by the respective crankshaft cams 25 and 26 at about 185° rotation of the crankshaft.

The opening of limit switch $1LS_6$ breaks the holding circuit in line 6 for anti-repeat relay B, so that this relay becomes de-energized. Accordingly, the "b" relay contacts in lines 4, 6, 10 and 13 open, and the set of "b" relay contacts in line 8 close. Relay B now cannot be re-energized until the set-up relay A is again energized.

The opening of the set of relay contacts $b_{13}$, in response to the de-energization of relay B, isolates the valve relays D and E from each other. Relays D and E remain independent of each other throughout the rest of the stroke.

Should either limit switch 2RS or 2LS have failed to close (at 175°), the de-energization of relay B (when switch $1LS_6$ opens at 185°) will cause the corresponding relay D or E to become de-energized at this time, thereby stopping the machine immediately.

Assuming that no such failures have occurred, when the crankshaft has turned through about 305°, the chain-driven cam 32 opens the limit switch 1RS. This breaks the holding circuit through lines 4 and 3 for anti-repeat relay C and this relay becomes de-energized. Relay C cannot become re-energized until after the set-up relay A and the first anti-repeat relay B are again energized.

The de-energization of relay C opens the "c" relay contacts in lines 3, 10 and 12 and closes the set of "c" relay contacts in line 8.

With line 8 broken at the now-open valve switches $2VS_3$ and $1VS_8$ and at the now-open contacts $e_8$ and $d_8$ of energized relays E and D, the set-up relay A cannot be re-energized at this time.

When the crankshaft has turned through approximately 330° the limit switch 2RS is opened by the chain-driven cam 33 and the limit switch 2LS is opened by the crankshaft cam 27.

The opening of limit switch 2RS breaks the holding circuit for valve relay D through line 11, so that relay D becomes de-energized.

The opening of limit switch 2LS breaks the holding circuit through line 14 for relay E so that this relay becomes de-energized.

Such de-energization of relay D opens the "d" relay contacts in line 1 and causes solenoid $K_1$ to become de-energized.

The de-energization of relay E opens the "e" relay contacts in line 2 and causes solenoid $K_2$ to become de-energized.

The de-energization of solenoids $K_1$ and $K_2$ results in the opening of the pilot valves 36 and 37 and the consequent closing of the poppet valves 33 and 34, thereby shutting off the air supply to the brake 24 and clutch 21. The clutch is disengaged and the brake is applied to the crankshaft. The crankshaft comes to a stop after it has completed 360° rotation, corresponding to a full stroke of the machine.

In addition, the re-closing of valves 33 and 34 causes switch $1VS_8$ to re-close, switch $1VS_{11}$ to re-open, switch $2VS_3$ to re-close, and switch $2VS_{14}$ to re-open.

Now, if the "run" switches 57 and 58 are not held depressed, all the switches and relay contacts in line 8 are closed. Accordingly, the set-up relay A will again be energized and the circuit will be conditioned for another single stroke cycle of operation of the machine. This next stroke is initiated by the operator when he depresses both "run" switches 57 and 58 and holds them down for the first 175° of rotation of the crankshaft 20, as previously described.

Note, however, that a repeat stroke cannot occur if the operator has held the "run" switches depressed throughout the stroke or has depressed them again toward the end of the stroke. In either case, the "anti-repeat" relays B and C cannot be energized again because the set-up relay A will remain de-energized due to line 8 being open, and the valve relays D and E cannot be energized through line 10.

The same result is obtained if the operator attempts to "beat" the control by staking down one of the "run" switches.

The limit switch $1LS_8$ is provided in line 8 to prevent any possibility of "telegraphing" (repeated sequential operation) between relays A, B and C. Such "telegraphing" might take place if the cam-operated limit switches 1RS and $1LS_8$ are so operated as to be open simultaneously, which should not happen if their respective operating cams are set properly. However, if this were to happen, in the absence of switch $1LS_8$, relay A would become energized through line A and cause relays B and C to become energized in succession, and after the relays are de-energized, the cycle would repeat itself. However, since switch $1LS_8$ in line 8 will open when switch $1LS_8$ opens, relay A cannot be energized at this time, and the undesired "telegraphing" is positively prevented.

The present control system provides a pair of independently operating control components or sub-assemblies for each control function. As explained in detail hereinafter, if either component or sub-assembly in any pair fails to operate properly, the machine will stop and a repeat stroke cannot take place. Thus, the system includes:

(a) The pair of "anti-repeat" relays B and C, which, once energized initially, operate independent of each other such that if either fails the machine will be stopped.

(b) The pair of limit switches $1LS_6$ and 1RS, which are operated independently by the separately driven cams 25 and 32, respectively, to control the "anti-repeat" relays B and C. If either of these limit switches, or the mechanism which operates it, fails to operate properly, the machine will be stopped.

(c) The pair of valve-operating relays D and E which, once energized initially, operate independent of each other through the last half cycle of the machine's operation, such that if either fails, the machine will be stopped.

(d) The pair of limit switches 2RS and 2LS, which are operated independently by the separately driven cams 33 and 27, respectively, to control the valve-operating relays D and E. If either of these limit switches, or the mechanism which operates it, fails to operate properly, the machine will be stopped.

(e) The pair of solenoid-operated valve and switch sub-assemblies, namely, (1) Solenoid $K_1$, pilot valve 36, poppet valve 33 and switches $1VS_8$ and $1VS_{11}$; and
(2) Solenoid $K_2$, pilot valve 37, poppet valve 34, and switches $2VS_8$ and $2VS_{14}$.

If any component in either of these sub-assemblies fails to operate properly, the machine will be stopped.

The present circuit is completely foolproof in operation in the event that one of the control components (solenoid, pilot valve, poppet valve, valve-operated switch, limit switch or relay) fails to operate properly. A repeat stroke of the machine is possible only in case certain pairs of the control components malfunction simultaneously. The probability of this happening is so remote as to be virtually non-existent.

MONITORING

Moreover, the present control circuit automatically monitors the performance of each control component. If any control component fails, the machine will be stopped automatically and the next cycle of operation will be prevented.

Valves

The automatic monitoring of the first pilot valve 36 takes place as follows:

(1) If this valve sticks closed, then the valve-operated switch $1VS_8$ in line 8 will not close at the completion of the cycle. Consequently, the set-up relay A cannot be again energized, which is a necessary preliminary to the opening of the second poppet valve 34 for the next cycle of operation of the machine.

(2) If this valve sticks open, such as through an internal failure or through failure of its operating solenoid $K_1$, the cycle of operation cannot even begin because it will maintain the first poppet valve 33 closed and prevent air from being admitted to the outlet line 23 to release the brake 24 and engage the clutch 21.

The automatic monitoring of the first poppet valve 33 takes place as follows:

(1) If this valve sticks open, the valve-operated switch $1VS_8$ in line 8 will not close at the end of the cycle. Therefore, the set-up relay A cannot again be energized and the second poppet valve 34 cannot be opened to begin the next stroke.

(2) If this valve sticks closed, the cycle cannot begin because air cannot be admitted to line 23 to release the brake and engage the clutch.

The automatic monitoring of the second pilot valve 37 takes place as follows:

(1) If it sticks open, the valve-operated switch $2VS_8$ in line 8 cannot close at the end of the cycle and the set-up relay A cannot be re-energized. Consequently, poppet valve 33 cannot be re-opened to start the next stroke.

(2) If valve 37 sticks open, through an internal failure of its operating solenoid $K_2$, the cycle of operation of the machine cannot begin because the normally-closed poppet valve 34 will prevent air from being applied to release the brake 24 and engage the clutch 21.

The automatic monitoring of the second poppet valve 34 takes place as follows:

(1) If it sticks open, the valve-operated switch $2VS_8$ in line 8 cannot close at the end of the cycle and the set-up relay A cannot again be energized. Therefore, the first poppet valve 33 cannot be re-opened to begin the next stroke.

(2) If valve 34 sticks closed, it prevents air from releasing the brake and engaging the clutch to begin the next stroke of the crankshaft.

Solenoids

If either solenoid $K_1$ or $K_2$ fails to energize or de-energize at the proper time, this will cause the respective pilot valve to remain open or closed, and the monitoring takes place as just described.

Valve-operated switches

The automatic monitoring of the valve-operated switches $1VS_8$, $1VS_{11}$, $2VS_8$ and $2VS_{14}$ takes place as follows:

(1) If switch $1VS_8$ sticks open, the set-up relay A is prevented from being again energized for the next stroke to take place.

(2) The same is true if switch $2VS_8$ sticks open.

(3) The same is true if switch $1VS_{11}$ sticks closed because this means that switch $1VS_8$ would thereby be stuck open.

(4) The same is true if switch $2VS_{14}$ sticks closed because this means that switch $2VS_8$ would be held open.

(5) If switch $1VS_8$ sticks closed, then switch $1VS_{11}$ in line 11 will be held open and relay D can be energized only if both "run" switches 57 and 58 are depressed. Therefore, an unintentional repeat stroke of the machine cannot be initiated. And even if the operator should initiate the next stroke by depressing the "run" switches 57 and 58, this stroke will be stopped at 185° when relay B is de-energized.

(6) The same is true if switch $1VS_{11}$ sticks open of itself.

(7) If switch $2VS_8$ sticks closed, then switch $2VS_{14}$ in line 14 will be held open and relay E can be energized only if both "run" switches 57 and 58 are depressed. Thus, the next stroke can be initated only if it is deliberately started by the operator, and even then it will be stopped at 185°.

(8) The same is true if switch $2VS_{14}$ sticks open of itself.

Relays

If the set-up relay A fails to operate properly when energized, the anti-repeat relays B and C cannot become energized and the next stroke cannot take place.

If the set-up relay A fails to operate properly when de-energized, the now-open $a_{10}$ contacts in line 10 will prevent the valve relays D and E from being energized through this line, thereby preventing the next stroke from beginning.

If the anti-repeat relay B fails to operate properly when energized, relays D and E cannot be energized through line 10 and the next stroke cannot take place.

If relay B fails to operate properly when de-energized, the set-up relay A cannot be again energized through line 8 at the end of the stroke to condition the circuit for the next stroke to take place.

Similarly, if relay C fails to operate properly when energized, relays D and E cannot be energized through line 10 and the next stroke cannot take place.

If relay C fails to operate properly when de-energized, the set-up relay A cannot be energized again through line 8 at the end of the stroke, so that the circuit may be conditioned for the next stroke to take place.

If relay D fails to operate properly when energized, the solenoid $K_1$ cannot be energized through line 1 and the stroke cannot take place.

If relay D fails to operate properly when de-energized, the set-up relay A cannot be again energized through line 8, which is a necessary preliminary to the next stroke of the machine.

If relay E fails to operate properly when energized, the solenoid $K_2$ cannot be energized through line 2 and the stroke cannot begin.

If relay E fails to operate properly when de-energized, the set-up relay A cannot again be energized through line 8 and the next stroke cannot take place.

Limit switches

If limit switch 1RS fails to open, relay C will remain energized through line 4 and the set-up relay A cannot be energized through line 8 for the next stroke to take place.

If limit switch 1RS fails to close, this would break the holding circuit for relay C through line 4. Consequently, relays D and E could not be energized through line 10 for the stroke to occur.

If limit switch $1LS_6$ fails to open, relay B will remain energized through line 6 and the set-up relay A cannot be energized through line 8 for the next stroke.

If limit switch $1LS_6$ fails to close, this would break the holding circuit for relay B through line 6. Therefore, relays D and E could not be energized through line 10 and the stroke cannot take place.

If limit switch $1LS_8$ fails to close after opening, then the set-up relay A cannot be energized again through line 8 for the next stroke.

If either limit switch 2RS or 2LS should fail to operate properly, either through an internal failure or breakage of the chain 29 which drives their respective operating cams, the next stroke will be prevented as follows:

(1) Failure of switch 2RS to open will maintain relay D energized through its holding circuit in line 11. Consequently, the set-up relay A cannot again be energized through line 8 for the next stroke to take place.

(2) Failure of switch 2RS to close will prevent the holding circuit in line 11 for relay D from being completed and when the limit switch $1LS_6$ opens, at a crankshaft position of about 185°, the machine will stop immediately.

(3) Failure of switch 2LS to open will maintain relay E energized through its holding circuit in line 14. Therefore, the set-up relay cannot again be energized through line 8 for the next stroke to take place.

(4) Failure of switch 2LS to close will prevent the holding circuit in line 14 for relay E from being completed and when the limit switch $1LS_6$ in line 6 opens, at a crankshaft position of about 185°, the machine will stop immediately.

The type of failure of limit switch 2RS or 2LS mentioned in 2 and 4 above is not dangerous, in that it would not result in an unexpected repeat stroke of the machine. However, the system does operate to monitor such a malfunctioning of either of these switches.

VALVE UNIT STRUCTURE

Figure 4:
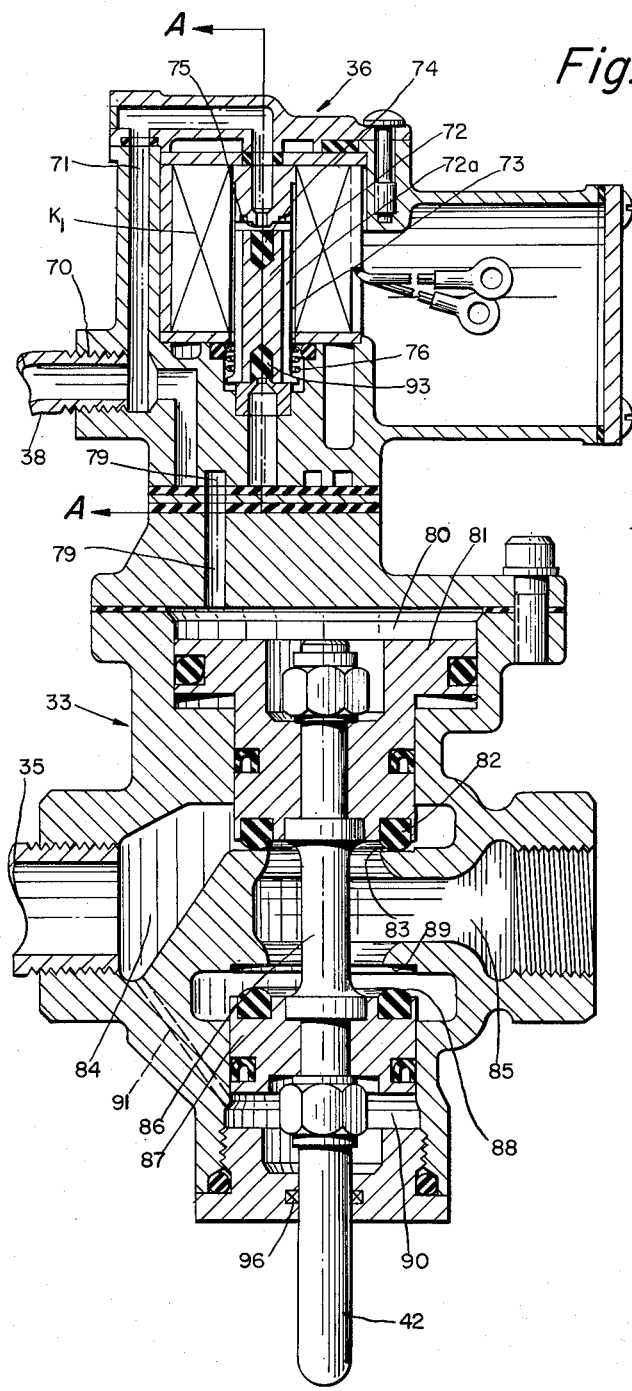
FIGURE 4 is a section through one valve unit in the present invention.
Figure 4A:
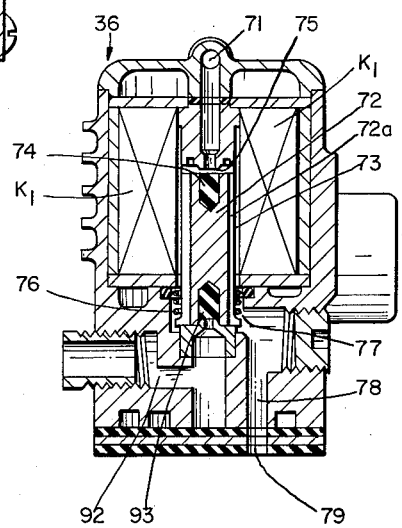
FIGURE 4A is a section along the line A—A in FIG. 4 through the pilot valve.

The detailed construction of the first pilot valve 36 and the first main valve 33 is shown in FIGS. 4 and 4A. The second valve unit, consisting of the pilot valve 37 and the main valve 34, is identical.

Referring to FIG. 4, the pilot valve has its inlet port 70 connected to the inlet line 38, which is connected to the main air line 35 ahead of the main valve 33. The inlet port 70 leads into an inlet passage 71. A vertically disposed armature or plunger 72 having lengthwise grooves 72a in its periphery is disposed slidably within a chamber 73 in the pilot valve. At its upper end the plunger carries a resilient insert 74 for engagement with the valve seat 75 to block the flow of said from the inlet passage 71 down into the chamber 73. The plunger is normally biased downward, due to gravity and the bias exerted by a coil spring 76 and the air pressure at the inlet passage 71, to permit air to flow from the inlet passage 71 down into chamber 73. As shown in FIG. 4A, an outlet passage 77 leads from the bottom of chamber 73 to a passage 78 (FIG. 4) which communicates with a passage 79 leading into the poppet chamber 80 of the main valve 33.

The poppet 81 at its lower end carries a resilient, compressible ring 82 for sealing engagement with a valve seat 83 to block the flow of air from the inlet chamber 84 to the outlet chamber 85 of the main valve. A stem 86 is connected to the poppet 81 to move therewith. At its lower end the stem carries a valve element 87 provided with a resilient, compressible ring 88 at its upper face for engagement with a seat 89. A chamber 90 below the valve element 87 communicates with the inlet chamber 84 through a passage 91 formed in the body of the valve. The surface area of the valve element 87 which is exposed to the air pressure in chamber 90 is appreciably less than the surface area of the poppet 81 which is exposed to the air pressure in the poppet chamber 80. Accordingly, therefore, when the plunger 72 of the pilot valve is in its normal (down) position, the downward force exerted by the air on the poppet 81 exceeds the upward force exerted by the air on the valve element 87. Therefore, the main valve is normally closed, as shown in FIG. 4.

The solenoid $K_1$ is disposed within the body of the pilot valve 36. When this solenoid is energized it pulls the pilot valve plunger 72 upward until it closes off the inlet passage 71 at the valve seat 75. The air pressure in chamber 73 of the pilot valve and in the poppet chamber 80 of the main valve is relieved through a relief passage 92 (FIG. 4A). Normally, this relief passage is blocked by the insert 93 on the lower end of the pilot valve plunger 72. However, when the plunger is pulled up by the solenoid, the relief passage 92 communicates with the lower end of the pilot valve chamber 73.

Due to the relieving of the air pressure in the poppet chamber 80, the air pressure acting against the valve element 87 in the main valve forces this valve element and the valve stem 86 and the poppet 81 upward. The air is now free to flow from the inlet chamber 84 of the main valve past the valve seat 83 to the outlet chamber 85.

The main valve 33 remains open as long as the pilot valve 36 remains closed, which condition is maintained only so long as the solenoid $K_1$ remains energized.

The plunger 42, which operates the valve switches $1VS_8$ and $1VS_{11}$, is connected to the lower end of the stem 86 and projects down through the bottom of the valve casing, a suitable seal 96 being provided to prevent air from leaking down around the plunger. The plunger 42 moves in unison with the valve stem 86 so that when the main valve is closed the plunger 42 is in its extended position below the valve and when the main valve is open the plunger is in its retracted position.

ALTERNATIVE CIRCUIT—FIG. 5

Figure 5:
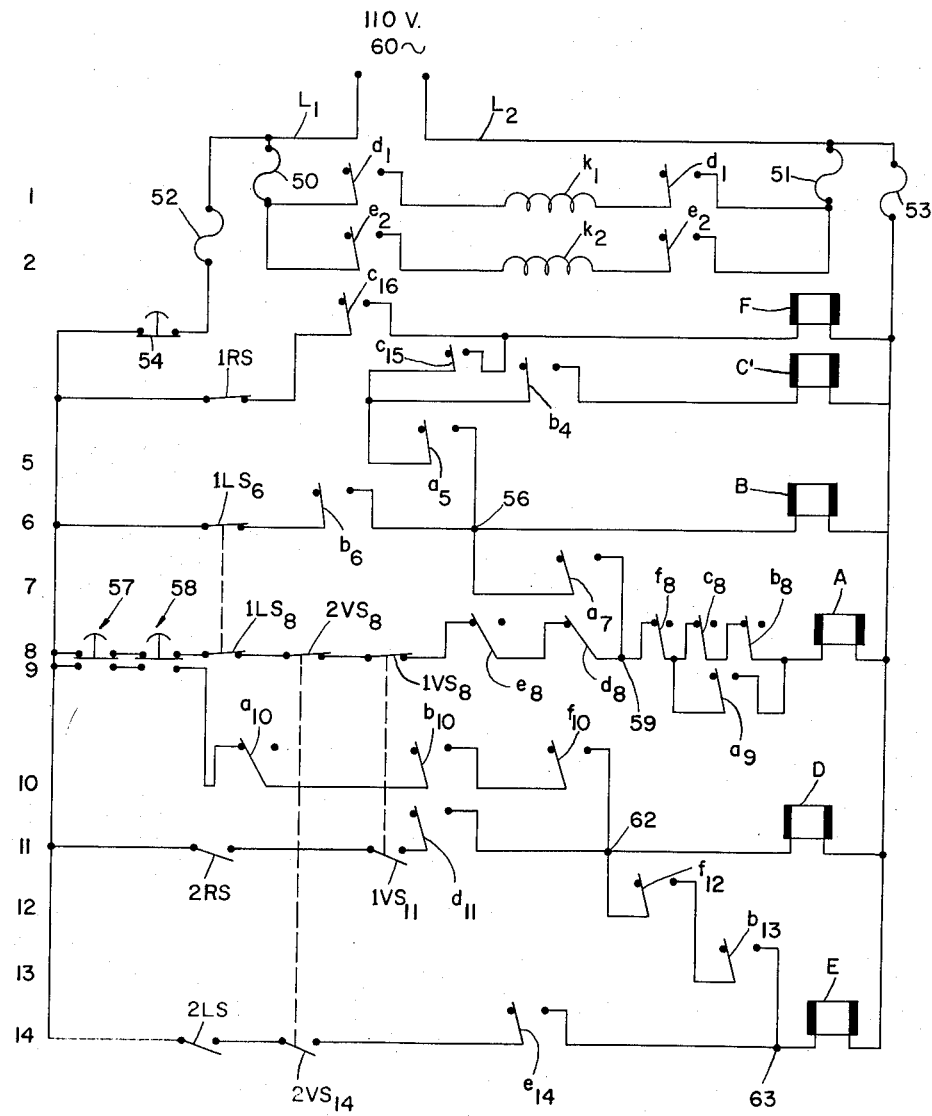
FIGURE 5 is a schematic diagram of a second embodiment of the electrical circuit in the present control system.

FIG. 5 shows an alternative circuit for use in the present system. Here, the functions of the single relay C in FIG. 3 are performed by a pair of relays C' and F. This alternative arrangement obviates the need for an overlap in the operation of two sets of relay contacts, as in FIG. 3.

In FIG. 5, the coil of relay F is connected across the power supply in series with limit switch 1RS and the normally-open set of relay contacts $c_{16}$ operated by relay C'.

The coil of relay C' is connected to the point 56 in line 6 through the normally-open sets of relay contacts $a_5$ and $b_4$. The former set of relay contacts $a_4$ (FIG. 3) is omitted.

A normally-open set of contacts $c_{15}$, operated by relay C', is connected between the juncture of the relay contacts $a_5$ and $b_4$ and the juncture of the set of relay contacts $c_{16}$ and relay F. Thus, a holding circuit for relay C' is provided through limit switch 1RS and the sets of relay contacts $c_{16}$ and $c_{15}$.

In lines 10 and 12, the former relay contacts $c_{10}$ and $c_{12}$ (FIG. 3) are replaced by relay contacts $f_{10}$ and $f_{12}$, operated by relay F.

In line 8 the energization circuit for the set-up relay A includes a normally-closed set of contacts $f_8$, operated by relay F. The normally-open set of relay contacts $a_9$ is connected across the series-connected sets of contacts $c_8$ and $b_8$ in line 8.

In all other respects, the FIG. 5 circuit is identical to FIG. 3.

In the operation of the FIG. 5 circuit, when the set-up relay A and the first anti-repeat relay B are energized, relay C' becomes energized through the $a_5$ and $b_4$ contacts. Such energization of relay C' causes its contacts $c_1$ and $c_{16}$ to close, so that relay F becomes energized. Accordingly, the relay contacts of $f_{10}$ and $f_{12}$ close, so that valve relays D and E become energized.

It will be noted that the initial energization of relay C' completed a holding circuit for this relay through the limit switch 1RS and the relay contacts $c_{16}$ and $c_{15}$. Accordingly, relay C' will remain energized through this holding circuit until the limit switch 1RS is opened. Also, relay F will remain energized through limit switch 1RS and relay contacts $c_{16}$.

It will be apparent that in this alternative arrangement the relays C' and F are energized in sequence so that the holding circuit for relay C' is completed a finite period of time before the set of contacts $f_8$ in line 8 opens to de-energize the set-up relay A. Therefore, there is no need to provide an overlap between the "c" contacts, which provide this holding circuit for relay C', and the contacts $f_8$ which cause relay A to be de-energized.

In other respects, the operation of the FIG. 5 circuit is identical to FIG. 3.

PREFERRED CIRCUIT—FIG. 6

Figure 6:
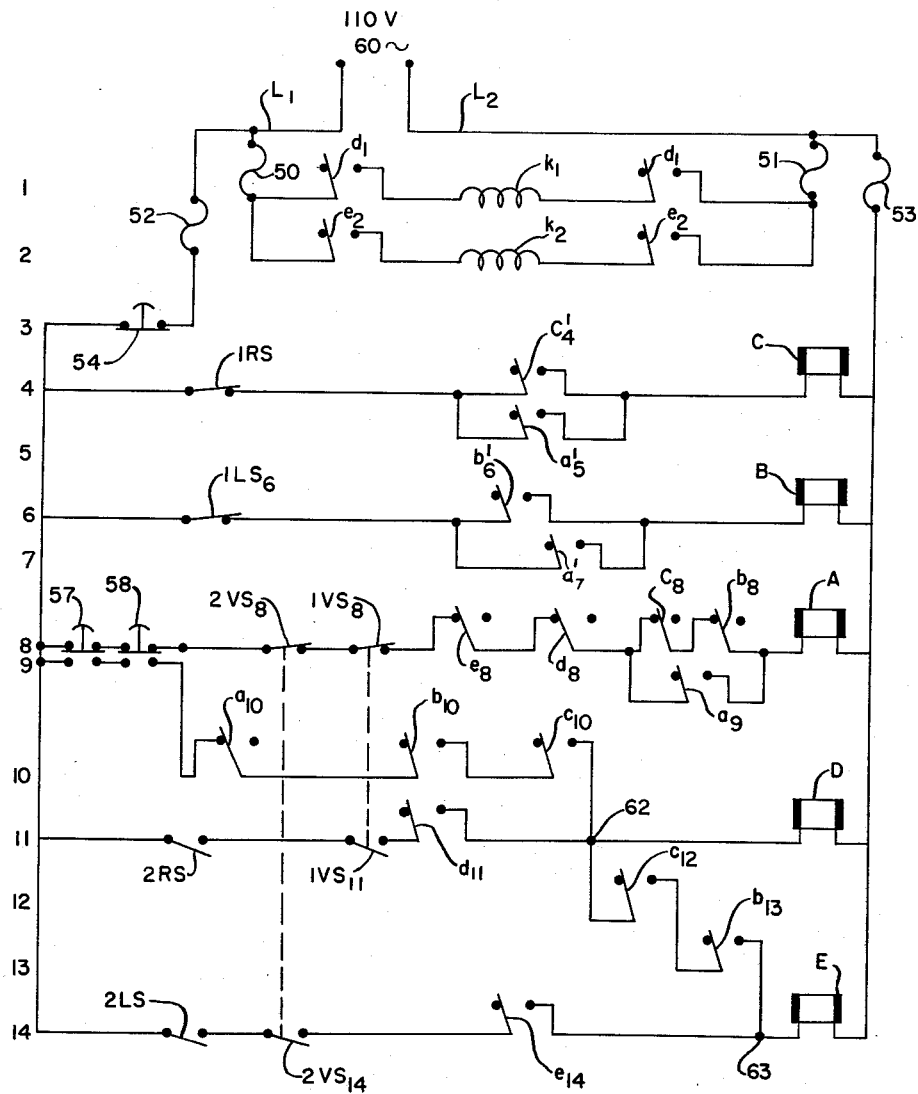
FIGURE 6 is a schematic diagram of a third embodiment of the electrical circuit in the present control system, this being the preferred embodiment.

A still further embodiment of the circuit in the present system is shown in FIG. 6. This is the preferred embodiment for a number of practical reasons.

In the FIGURE 6 circuit the set-up relay A is provided with sets of contacts $a'_7$ and $a'_5$ for energizing the anti-repeat relays B and C, respectively. When the coil of relay A is energized it closes the contacts $a'_7$ to initially energize the coil of relay B and at the same time it closes the contacts $a'_5$ to initially energize the coil of relay C. Following their initial energization in this manner, the coil of relay B completes a holding circuit for itself through its contacts $b'_6$ and the coil of relay C completes a holding circuit for itself through its contacts $c'_4$. It will be noted that in this embodiment the relays B and C are energized simultaneously, rather than sequentially, and are completely independent and isolated from each other at all times.

This arrangement completely eliminates a difficulty which might arise if severe contact "bounce" should happen to occur at the holding contacts $c_3$ of relay C in the FIG. 3 circuit, or at the corresponding holding contacts for either relay B or relay C' in FIG. 5.

In either case the situation might arise that the holding contacts for either anti-repeat relay B or C might bounce open just at the time that the set-up relay A is being de-energized by the breaking of its energization circuit in line 8. In such case, the stroke of the machine could not be initiated by depressing the "run" switches 57 and 58, and the set-up relay would be locked out so that it could not again be energized to set up the anti-repeat relays preliminary to the operation of the control circuit in the manner described.

For example, in the FIG. 3 circuit if the holding contacts $c_3$ should bounce open just after the contacts $c_8$ have opened and thereby de-energized the set-up relay A, the following would happen: Relay C would become de-energized since contacts $c_3$ and $a_4$ are now open. Therefore, contacts $c_8$ would again close. However, relay B would remain energized (through its holding contacts $b_6$) and its $b_8$ contacts would remain open. With the $b_8$ and $a_8$ contacts both open there is no possibility of automatically re-energizing relay A to again set up the anti-repeat relays B and C. And with relay C de-energized, one cannot initiate a stroke of the machine by depressing the "run" switches 57 and 58. As long as this condition prevails, the entire control circuit and the machine will be stalled.

A similar difficulty would occur in the event of severe contact bounce at any of the other holding contacts for the anti-repeat relays in either FIG. 3 or FIG. 5.

This difficulty cannot arise in the FIG. 6 circuit because the energization of the anti-repeat relays does not result in the immediate de-energization of the set-up relay A. Rather, the set-up relay A retains its holding circuit through its $a_9$ contacts until the "run" switches 57 and 58 are depressed. Accordingly, the occurrence of any severe contact "bounce" at the holding contacts for either anti-repeat relay B or C would not lock out the set-up relay A.

In addition to eliminating the problems attendant to contact bounce at the holding contacts of either anti-repeat relay, the circuit of FIGURE 6 is inherently safer because of the fact that the anti-repeat relays B and C are independent of each other and isolated at all times.

Also, in the FIGURE 6 circuit each relay has just four sets of contacts, so that all relays in the control panel may be identical to each other.

The circuit of FIGURE 6 requires one less relay in the panel than the FIGURE 5 circuit, while at the same time avoiding the need for overlapping contacts in the second anti-repeat relay, as in FIGURE 3.

Also, it will be noted that the double pole limit switch $1LS_6$ and $1LS_8$ in the circuits of FIGURES 3 and 5 is replaced by a single pole switch $1LS_6$ in the circuit of FIGURE 6.

Except for these changes the circuit of FIGURE 6 operates the same as the circuits of FIGURES 3 and 5, the correspondingly designated elements oprating in the same manner as in FIGURES 3 and 5. The sequence of operation of the limit switches 1RS, 2RS, $1LS_6$ and 2LS is the same as in FIG. 2.

While the preceding description and the accompanying drawings are directed to the three different embodiments of the present invention, it is to be understood that various modifications, omissions and refinements which depart from the disclosed embodiments may be adopted without departing from the spirit and scope of this invention.

For example, in the fluid control unit the plunger-operated switches $1VS_8$ and $1VS_{11}$ may be replaced by pressure-operated switches connected in the air line after the first main valve 33 and ahead of the second main valve 34 so as to respond to the operation of the first main valve only.

This application is a continuation-in-part of our co-pending application, Serial No. 738,107, filed May 27, 1958, now abandoned.

Having thus described our invention, we claim:

1. A single cycle control system for a machine in which fluid pressure controls the starting and stopping of the machine, said system comprising: a pair of valves connected to control said fluid pressure such that the machine is stopped if either valve is closed, a pair of valve relays operable independent of one another to control the respective valves individually, a pair of anti-repeat relays operable to energize the valve relays initially to cause the respective valves to open, a pair of separate holding circuits connected individually to the respective valve relays to maintain the latter energized independent of each other following their initial energization, a first pair of limit switches connected respectively in said holding circuits and operable separately and independent of one another by the machine toward the end of the latter's cycle of operation to open the respective holding circuits individually independent of one another to de-energize the respective valve relays individually independent of one another, and a second pair of switches connected respectively in said holding circuits and operable individually independent of one another to close in response to the opening of the respective valves.

2. The control system of claim 1, wherein there are provided a pair of separate limit switches connected to control individually and independent of one another the energization of the respective anti-repeat relays and operable separately and independent of one another by the machine during its cycle of operation to de-energize the respective anti-repeat relays individually independent of one another.

3. In a single cycle control system for a machine in which fluid pressure controls the starting and stopping of the machine, the improvement which comprises: a pair of separate valve units connected to control said fluid pressure such that the machine is stopped if either valve unit is closed, a pair of valve relays which operate said valve units to stop the machine if either valve relay is de-energized, a pair of anti-repeat relays which control the initial energization of said valve relays, a first pair of separate limit switches connected respectively to said valve relays and operable individually independent of one another to control the energization of said valve relays after they have been energized initially, and a second pair of separate limit switches connected respectively to said anti-repeat relays and operable individually independent of one another to control the operation of said anti-repeat relays, each limit switch in each pair being operable through its cycle for each cycle of operation of the machine.

4. In a single cycle control system for a machine, the combination of a pair of control devices which when actuated start the cycle of operation of the machine, a pair of anti-repeat devices operable to actuate said control devices for starting the cycle of operation of the machine, a pair of separate stopping limit switches which control the operation of said control devices individually independent of one another following their actuation by said anti-repeat devices and which are operated individually independent of one another during each cycle of operation of the machine to disable said control devices, and a pair of separate anti-repeat limit switches which control the operation of said anti-repeat devices individually independent of one another and which are operated individually independent of one another during each cycle of operation of the machine to disable said anti-repeat devices from again actuating said control devices, thereby preventing a repeat cycle of operation of the machine.

5. A single cycle control system for a machine comprising: a pair of separate control means which both control the starting and stopping of the machine; a pair of control devices operable to control individually the operation of the respective control means; a pair of anti-repeat devices connected to control jointly the initial operation of said control devices; a first pair of limit devices connected to establish separate lines for said control devices to maintain the latter's operation independent of each other and independent of said anti-repeat devices following their operation initially by said anti-repeat devices; means for operating said anti-repeat devices initially; a second pair of limit devices connected to establish separate lines for said anti-repeat devices to maintain the latter's operation independent of each other and independent of said last-mentioned means following their initial operation by said last-mentioned means; a first pair of control means operable individually during each stroke of the machine to actuate individually and independent of one another the limit devices of said second pair to disconnect said lines which maintain the operation of said anti-repeat devices; and a second pair of separate control means operable individually during each stroke of the machine to actuate individually and independent of one another the limit devices of said first pair to disconnect said lines which maintain the operation of said control devices.

6. A single cycle control system for a machine in which fluid pressure controls the starting and stopping of the machine, said control system comprising: a pair of valve means connected to jointly control said fluid pressure; a pair of separate valve control means operable to control individually the operation of the respective valve means; a pair of anti-repeat devices connected to control jointly the initial energization of said valve control means; a first pair of limit switches connected to provide separate holding circuits for said valve control means to maintain the latter energized independent of each other and independent of said anti-repeat devices following their initial energization; means for energizing said anti-repeat devices initially; a second pair of limit switches connected to provide separate holding circuits for said anti-repeat devices to maintain the latter energized independent of each other and independent of said last-mentioned means following their initial energization; a first pair of separate control means operable individually during each stroke of the machine to actuate individually and independent of one another the limit switches of said second pair to de-energize said anti-repeat relays; and a second pair of separate control means operable individually during each stroke of the machine to actuate individually and independent of one another the respective limit switches of said pair to de-energize said valve control means.

7. A single cycle control system for a machine in which a fluid pressure line controls the operation of the machine, said control system comprising: a pair of valve means connected in series in said line to jointly control the operation of the machine independent of one another; a power source; a pair of solenoids operable respectively to control the operation of said pair of valve means individually, a first pair of individual circuits connecting said solenoids individually to said power source independent of each other, separate sets of relay contacts connected in said circuits to control the energization of the respective solenoids individually from the power source; a pair of valve operating relays which operate said sets of relay contacts individually independent of each other, a second pair of individual circuits connecting said valve-operating relays individually to said power source independent of each other, a first pair of separate limit switches connected individually in said last-mentioned circuits to control the energization of said valve-operating relays individually; a pair of anti-repeat relays, a third pair of individual circuits connecting said anti-repeat relays to said power source independent of each other, a second pair of separate limit switches connected individually in said last-mentioned circuits to control the energization of said anti-repeat relays individually from the power source; means for energizing said anti-repeat relays initially from the power source prior to the beginning of a stroke of the machine; an additional circuit for energizing both said valve-operating relays independent of said second circuits, operator-controlled normally-open switch means connected in said additional circuit, individual sets of relay contacts connected in additional circuit and operable respectively independent of one another by said anti-repeat relays to complete said additional circuit to energize the valve-operating relays initially after the anti-repeat relays have been energized when said operator-controlled switch means is closed; a first pair of separate control members operable individually independent of one another during each stroke of the machine to actuate individually and independent of one another the respective limit switches of said second pair to de-energize said anti-repeat relays individually independent of one another; and a second pair of separate control members operable individually independent of one another during each stroke of the machine to actuate individually and independent of one another the respective limit switches of said first pair to de-energize said valve-controlling relays individually independent of one another.

8. The control system of claim 7 wherein said energizing means for the anti-repeat relays comprises a set-up relay operable when energized to energize said anti-repeat relays independent of each other, and wherein there is provided means for maintaining said set-up relay energized independent of said antirepeat relays until said operator-controlled switch means is closed.

9. A single cycle control system for a machine in which fluid pressure controls the operation of the machine, said control system comprising: a pair of valve means connected to control jointly said fluid pressure independent of one another; a pair of electrical control devices which control the respective valve means individually; a first pair of individual separate circuits for connecting said electrical control devices individually to a power source independent of each other, separate switch means connected in said circuits to control the energization of said electrical control devices individually from the power source; a first pair of electrical operating devices which operate said switch means individually independent of one another, a second pair of individual circuits for connecting said first operating devices individually to the power source independent of each other, a first pair of separate limit switches connected in said last-mentioned circuits to control the energization of said first operating devices individually from the power source; a second pair of electrical operating devices, a third pair of individual circuits for connecting said second operating devices individually to the power source independent of each other, a second pair of separate limit switches connected individually in said last-mentioned circuits to control the energization of said second operating devices individually from the power source; means for energizing said second operating devices initially prior to the beginning of a stroke of the machine; an additional circuit for energizing both said first operating devices independent of said second circuits, operator-controlled switch means connected in said additional circuit, a plurality of individual switch means connected in said additional circuit and operable respectively by said second operating devices to complete said additional circuit to energize said first operating devices initially after said second operatng devices have been energized when said operator-controlled switch means is closed; a first pair of separate control members operable individually independent of one another during the stroke of the machine to actuate individually independent of one another the respective limit switches of said second pair to de-energize said second operating devices individually independent of one another; and a second pair of separate control members operable individually independent of one another during the stroke of the machine to actuate individually independent of one another the respective limit switches of said first pair to de-energize said first operating devices individually independent of one another.

10. A fluid control unit for a machine in which fluid pressure controls the operation of the machine, said fluid control unit comprising: a first main valve having an inlet for connection to a fluid pressure line and having an outlet, a second main valve having an inlet connected to the outlet of the first main valve and having an outlet for connection to an outlet line, a normally-open first pilot valve having an inlet connected ahead of the first main valve and having an outlet connected to said first main valve to normally maintain the latter closed, means for selectively closing said first pilot valve to permit the first main valve to open, a normally-open second pilot valve having an inlet connected ahead of said first main valve and having an outlet connected to said second main valve to normally maintain the latter closed, and means for selectively closing said second pilot valve to permit the second main valve to open.

11. In a single cycle control system for a machine in which fluid pressure controls the operation of the machine, the improvement which comprises: a pair of separate valves each connected to control said fluid pressure, means controlling the operation of said valves to open each valve at the beginning of each cycle of the machine and to close each valve at the end of each cycle of the machine, energization means controlling the operation of said controlling means, and a pair of separate switches connected in said energization means so that each independently controls the operation of said controlling means, said switches being positioned respectively to be opened and closed independent of one another by said valves for each cycle of the machine so that upon failure of either valve or either switch to operate properly said controlling means will be ineffective to operate the other valve to cause the next stroke of the machine to take place.

12. In a single cycle control system for a machine in which fluid pressure controls the operation of the machine, the improvement which comprises: a pair of separate valves connected to control said fluid pressure such that the machine is stopped if either valve is closed, a pair of separate operating devices operable when energized to cause the respective valves to open independent of one another at the beginning of each cycle of the machine and operable when de-energized to cause the respective valves to close independent of one another at the end of each cycle of the machine, means for energizing said operating devices initially to cause the valves to open to initiate a stroke of the machine, a pair of separate holding circuits for the respective operating devices to maintain the latter energized independent of one another following their initial energization, a pair of separate normally-open swtches positioned to be closed respectively by the valves independent of one another when the valves open at the beginning of each stroke of the machine and to be opened individually independent of one another by the valves when the latter close at the end of each stroke of the machine, said switches being connected respectively in said holding circuits so that upon failure of either switch to close the respective holding circuit will be broken to de-energize the respective operating device and cause the respective valve to close to stop the machine.

13. In a single cycle control system for a machine having a fluid pressure line for controlling the operation of the machine, the improvement which comprises: a pair of separate normally-closed main valves connected in said line to control the flow of fluid therethrough such that the machine is stopped if either valve is closed, a pair of separate normally-open pilot valves for operating the respective main valves separately independent of one another, each of said pilot valves having its input connected to said line ahead of both main valves and having its output connected to the respective main valve to normally maintain the latter closed, a pair of separate solenoids for closing the respective pilot valves individually independent of one another to open the respective main valves, control means for controlling the energization of both said solenoids to energize and de-energize each solenoid for each stroke of the machine, an energization circuit for said control means which controls the latter's operation, and a pair of separate normally-closed switches connected in said energization circuit to control individually and independent of one another the operation of said control means, said switches being positioned to be opened individually independent of one another by the respective main valves at the beginning of each stroke of the machine when both solenoids are energized to close the respective pilot valves which open the respective main valves, each of said switches being held open by the respective main valve as long as the latter remains open so that upon failure of either main valve to close at the end of the stroke of the machine when the solenoids are de-energized said control means will be ineffective to reenergize the solenoids so that the other main valve will be reopened for the next stroke of the machine to take place, each of said switches being operable to close when the respective main valve closes.

14. In a single cycle control system for a machine having a fluid pressure line for delivering fluid to start the stroke of the machine, the improvement which comprises: a pair of separate normally-closed valves connected in said line to control the flow of fluid therethrough such that the machine is stopped if either valve is closed, means controlling the operation of both of said valves to open and close each valve for each cycle of the machine, an energization circuit for said controlling means which controls the latter's operation, and a pair of separate normally-closed switches connected in said energization circuit so that each independently controls the operation of said controlling means, said switches being positioned to be opened separately independent of one another by the respective valves when the latter open at the beginning of each stroke of the machine and to remain open as long as the respective valve remains open so that upon failure of either valve to close or either switch to close at the end of said stroke of the machine said controlling means will be ineffective to re-open the other valve for the next stroke of the machine to take place, each of said switches being operable to close when the respective valve closes.

15. In a single cycle control system for a machine in which fluid pressure controls the starting and stopping of the machine, the improvement which comprises: a pair of normally-closed valves connected to control said fluid pressure such that the machine is stopped if either valve is closed, control means operative when energized to open said valves, a set-up relay, a circuit for energizing said set-up relay, means operable after the energization and de-energization of said set-up relay for energizing said control means to cause the valves to open, and a pair of separate normally-closed switches connected in said energization circuit for the set-up relay to control the latter's energization, said switches being positioned to be opened individually independent of one another by the respective valves when the latter open at the beginning of each stroke of the machine, each of said switches being held open by the respective valve independent of the other valve as long as the respective valve remains open to thereby maintain the set-up relay de-energized to prevent a repeat stroke of the machine, each switch closing when the respective valve closes at the end of each stroke of the machine.

16. In a single cycle control system for a machine in which fluid pressure controls the starting and stopping of the machine, the improvement which comprises: a pair of valve means connected to control said fluid pressure, a pair of relays operable for each cycle of the machine to open and close the respective valve means individually independent of one another, means for energizing the relays initially to open the respective valve means to start the machine, a pair of separate holding circuits connected to the respective relays to maintain the latter separately energized independent of each other following their initial energization, and a pair of switches connected respectively in said holding circuits and operated individually independent of one another by the respective valve means to close when the respective valve means opens at the beginning of each cycle of the machine to thereby complete the respective holding circuits for the relays, each of said switches closing when the respective valve means closes at the end of each cycle of the machine.

17. In a single cycle control system for a machine in which fluid pressure controls the starting and stopping of the machine, the improvement which comprises: a pair of valve means connected to control said fluid pressure, a pair of relays operable for each cycle of the machine to open and close the respective valve means separately independent of one another, means for energizing the relays initially to open the respective valve means to start the machine, a pair of separate holding circuits connected to the respective relays and operable to maintain the relays separately energized independent of each other following their initial energization, and a pair of separate limit switches connected respectively in said holding circuits and each operable through its cycle separately during each stroke of the machine to open said holding circuits and de-energize the respective relays to stop the machine at the end of said stroke.

18. The combination of claim 17, wherein there are provided a pair of switches connected respectively in said holding circuits and operated individually by the respective valve means to close when the respective valve means opens at the beginning of each cycle of the machine and to open when the respective valve means closes at the end of each cycle of the machine.

19. In a single cycle control system for a machine having control means for starting and stopping the machine, the improvement which comprises: a pair of electrical control devices each operable through its cycle for each cycle of operation of the machine to control the operation of said control means, means for initially energizing said devices to cause the machine to start a stroke, a pair of separate holding circuits connected to the respective devices and operable to maintain the devices separately energized independent of one another following their initial energization, and a pair of separate limit switches connected respectively in said holding circuits and each operable separately through its cycle during each stroke of the machine to open the respective holding circuit and de-energize the respective device to cause the machine to stop at the end of its stroke.

20. In a single cycle control system for a machine in which fluid pressure controls the starting and stopping of the machine, the improvement which comprises: a pair of separately normally-closed valves connected to control said fluid pressure such that the machine is stopped if either valve is closed, a pair of separate relays each operable through its cycle for each cycle of operation of the machine to open and close the respective valves individually independent of one another, means for energizing said relays initially to open the respective valves to initiate a stroke of the machine, a pair of individual holding circuits operative to maintain the respective relays separately energized independent of one another following their initial energization, a pair of separate limit switches connected respectively in said holding circuits to control independently the continued energization of the respective relays, each of said limit switches closing for each stroke of the machine, and a pair of separate control members operable individually by the machine during each stroke to open the respective limit switches separately independent of one another to stop the machine at the end of said stroke.

21. In a single cycle control system for a machine having control means for starting and stopping the machine, the improvement which comprises: a pair of separate relays operable jointly when both are energized to actuate said control means to start the machine and operable individually when either is de-energized to actuate said control means to stop the machine, means for initially energizing both said relays for each stroke of the machine to cause the machine to start a stroke, a pair of separate holding circuits connected to the respective relays and operable to maintain the relays separately energized independent of one another following their initial energization, means for opening said holding circuits separately independent of one another to de-energize the relays at the completion of each stroke of the machine, and a pair of separate sets of contacts operated respectively by the relays and connected to control the operation of said initial energizing means such that upon failure of either relay to be de-energized at the completion of the stroke of the machine said initial energizing means will be rendered ineffective to energize both relays to initiate the next stroke of the machine.

22. The combination of claim 21, wherein said means for opening said holding circuits for the relays comprises a pair of separate normally-closed limit switches connected respectively in said holding circuits, and a pair of separate means operated individually by the machine during its stroke to open the respective limit switches and thereby de-energize the respective relays.

23. In a single cycle control system for a machine having means for controlling the starting and stopping of the machine, the improvement which comprises: a pair of anti-repeat devices each operable through its cycle for each cycle of operation of the machine to control the operation of said controlling means, means for operating both said devices prior to the beginning of a stroke of the machine, and means for maintaining the operation of said devices independent of each other after they have been initially operated.

24. The combination of claim 23, wherein said last-mentioned means is rendered operative in response to the initial operation of said devices.

25. In a single cycle control system for a machine having means for controlling the starting and stopping of the machine, the improvement which comprises: a pair of anti-repeat relays each operable through its cycle for each cycle of operation of the machine to control the operation of said controlling means, a set-up relay, circuit means operable by the set-up relay to energize said anti-repeat relays initially prior to the beginning of each stroke of the machine, and means operable in response to the energization of said anti-repeat relays to complete separate holding circuits for said anti-repeat relays which maintain the anti-repeat relays separately energized independent of each other following their initial energization.

26. The combination of claim 25, wherein there are provided a pair of limit switches connected respectively in said holding circuits and operable separately independent of one another during each stroke of the machine to open said holding circuits separately independent of one another and de-energize the respective anti-repeat relays.

27. In a single stroke control system for a machine having means for controlling the starting and stopping of the machine, the improvement which comprises: a pair of anti-repeat relays each operable through its cycle for each cycle of operation of the machine to control the operation of said controlling means, a set-up relay, an initial energization circuit which includes contacts operated by said anti-repeat relays, circuit means operable to energize the anti-repeat relays independent of each other in response to the initial energization of the set-up relay, a holding circuit for maintaining the set-up relay energized independent of the anti-repeat relays following the latter's energization, and operator-controlled means for starting the machine following the energization of the anti-repeat relays and for breaking said holding circuit to de-energize the set-up relay.

28. The control system of claim 27 wherein there are provided a pair of separate holding circuits for maintaining the anti-repeat relays separately energized independent of one another following the starting of the machine, a pair of separate normally-closed limit switches connected respectively in said last-mentioned holding circuits, and a pair of separate control means operable individually during the stroke of the machine to open said limit switches individually independent of one another and de-energize the respective anti-repeat relays individually independent of one another.

References Cited in the file of this patent

UNITED STATES PATENTS

| | | |
|---|---|---|
| 2,302,838 | Bundy | Nov. 24, 1942 |
| 2,471,505 | Winther | May 31, 1949 |
| 2,636,581 | Bitler | Apr. 28, 1953 |
| 2,794,523 | Cortelli et al. | June 4, 1957 |
| 2,848,087 | Simson et al. | Aug. 19, 1958 |
| 2,886,155 | Hadley | May 12, 1959 |

UNITED STATES PATENT OFFICE
CERTIFICATE OF CORRECTION

Patent No. 3,004,647                      October 17, 1961

Everett H. Andrus et al.

It is hereby certified that error appears in the above numbered patent requiring correction and that the said Letters Patent should read as corrected below.

Column 3, line 68, after "C," insert -- D --; column 5, line 4, for "relay b" read -- relay B --; line 5, for "relay c" read -- relay C --; line 7, for "relay d" read -- relay D --; column 9, line 55, before "of", first occurrence, insert -- or failure --; column 11, line 55, for "said" read -- air --; column 13, line 2, for "$c_1$" read -- $c_{15}$ --; column 14, line 26, for "oprating" read -- operating --; column 17, line 32, for "operati" read -- operating --; column 20, line 24, for "separately" read -- separate --.

Signed and sealed this 10th day of April 1962.

(SEAL)
Attest:

ERNEST W. SWIDER                          DAVID L. LADD
Attesting Officer                        Commissioner of Patents